July 13, 1971 — O. J. PARKER — 3,592,768
FLARED TUBE STRAINER
Filed Nov. 23, 1966

INVENTOR
OTIS J. PARKER
BY
ATTORNEYS

United States Patent Office 3,592,768
Patented July 13, 1971

3,592,768
FLARED TUBE STRAINER
Otis J. Parker, Chesapeake, Va., assignor to the United States of America as represented by the Administrator of the National Aeronautics and Space Administration
Filed Nov. 23, 1966, Ser. No. 596,733
Int. Cl. B01d 35/02
U.S. Cl. 210—445                                1 Claim

ABSTRACT OF THE DISCLOSURE

A strainer for a flared tube fitting. The strainer has a filtering portion which fits within the tube. A fitting is secured to the filtering portion and is flared to match the tube flaring. The flared portion of the fitting is clamped between the tube and a connector positioning and fixing the strainer in the tube.

---

Figure 1:
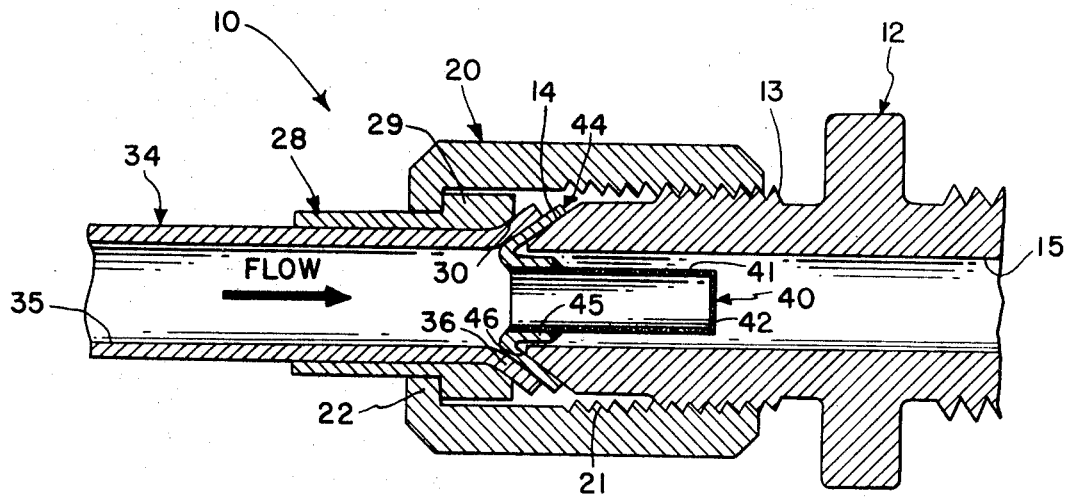

The invention described herein was made by an employee of the United States Government and may be manufactured and used by or for the Government for governmental purposes without the payment of any royalties thereon or therefor.

This invention relates to a strainer, and more particularly to a srainer which is utilized in a system having flared tube fittings.

A great deal of tubing and connectors are utilized in space-age hardware which conveys both liquids and gases. Much of this tubing or plumbing utilizes flared fittings, since they are normally superior from the sealing and structural integrity viewpoint. Much of the liquid and gases conveyed by such plumbing encounters in its path of travel machinery which is susceptible to injury due to possible foreign matter being conveyed in the fluid medium. Therefore, it is necessary to provide much of this plumbing with strainers or filters to take out possible unwanted material in the flow stream.

Although there are many types of strainers or filters which will accomplish this result, most of these strainers are bulky, and often times the adapters used to retain the strainers are space consuming and heavy. In view of the fact that it is mandatory in space equipment to utilize space to the maximum advantage and hold weight to a minimum, many of these strainer arrangements are usable. Furthermore, the reliability required in space equipment is extremely high, making it necessary to utilize flared tubing for the utmost in reliability and safety. Thus, many of the prior art strainer designs such as straight-in-line, T-head, disc and multistage strainers known in the prior art cannot be used.

The present invention overcomes the above-mentioned difficulties by providing a strainer that can be utilized with a flared tube fitting which is clamped in position between the flared portions of the elements to be connected requiring a minimum of weight and space.

Accordingly, it is an object of this invention to provide a strainer which can be utilized with fluid conduits having flared connector portions or elements.

Yet another object of the invention is to provide a strainer for use with fluid conduits having flared connecting elements which has both a minimum of weight and space occupancy.

Still another object of the invention is to provide a filter or strainer for use in fluid conduits having flared connector elements which is extremely reliable, readily accessible and thereby replaceable.

An additional object of the invention is to provide a strainer for use in fluid conduits having flared connector elements wherein the filter is clamped between the flared elements and retained in position within the conduits so as to present a minimum of interference to flow through the conduits.

Another object of the invention is to provide a strainer which can be used with flared connector elements without having to alter the elements.

These and other objects and advantages of the invention will become more apparent upon reading the specification in conjunction with the accompanying drawings.

Figure 2:
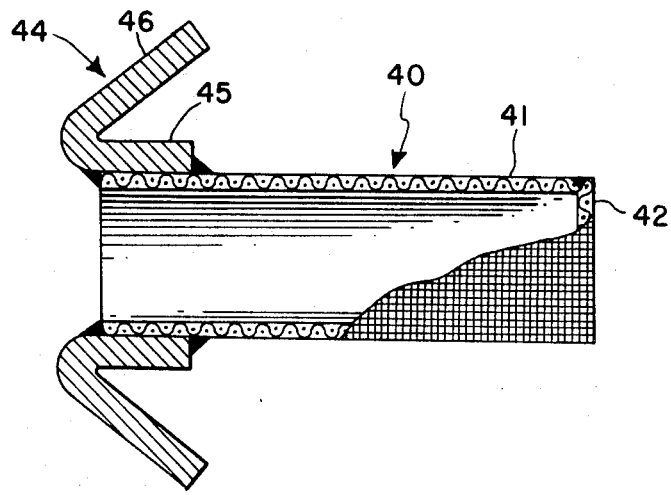

In the drawings:
FIG. 1 is a cross sectional view of connected conduits having flared portions, showing the strainer installed in the conduit; and
FIG. 2 is a side elevational view of the strainer partially cut away to show the remainder of the strainer in cross section.

Referring now more specifically to the details of the invention, FIG. 1 shows the invention strainer assembly designated generally by the reference numeral 10.

The strainer assembly 10 includes a connector 12 which is adapted for use with a flared tube 34. The connector 12 is of a generally annular shape having threads 13 formed on the exterior thereof. One end of the connector has a flare 14 designed to match flared tube 34. A passage 15 is formed through the connector to allow flow of liquid or gases therethrough.

A nut 20 having a rather elongated shape has threads 21 formed on the interior thereof which engage the threads 13 on the connector. The nut 20 also has a lip 22 formed integral therewith which is adapted to engage a sleeve 28 now to be described.

The sleeve 28 is also an annular member and is designed to surround the tube 34. A shoulder 29 is formed integral with the sleeve 28 and interengages with the lip 22, as shown in FIG. 1. The one end of the sleeve 28 is beveled at 30 at an angle to match the flare angle of the tube for purposes which will be explained more fully hereinafter.

The tube 34 is conventional in design having an internal passage 35. The end of the tube is flared at 36 to match the flare 14 of the connector 12.

The strainer, designated generally by the reference numeral 40, is shown installed in FIG. 1 and as an individual unit in FIG. 2. The major portion of the strainer is of a generally cylindrical design, this portion being designated by the reference numeral 41. The one end of the strainer is closed by a generally disc-shaped member 42. The sides 41 and end 42 of the strainer are made from strainer or filter material which may be constructed out of most any type of material which will allow passage of the particular fluid or gas encountered, yet restrain flow of foreign matter. For example, a wire screen or mesh may be utilized to form the strainer. In the particular example shown, the strainer end is welded or brazed to the cylindrical side portion to form a generally cup-shaped strainer. The strainer is normally of a smaller diameter than that of the passage in which it is to be placed in order to allow the gases to escape through the side as well as the end of the strainer without impeding flow of material moving through the passage.

Fixed to the other end or open end of the strainer is a fitting 44. The fitting 44 has an annular section 45 which surrounds the open end or the end opposite 42 of the strainer. This annular portion 45 of the fitting is fixed to the strainer in a conventional manner such as by welding. The diameter of the annulus is designed so that it will fit easily within the connector passage, as shown in FIG. 1, and position the strainer away from the walls of the passage.

The other portion or flared portion 46 of the fitting is turned up and back to an angle which matches the flare 14 of the connector and 36 of the tube.

OPERATION

The installation and operation of the strainer is believed to be apparent from FIG. 1. The filtering portion of the strainer is inserted in the connector passage 15 until the flared portion 46 of the fitting abuts the flare 14 of the connector. The flared portion 36 of tube 34 is then brought into position such that it engages the flared portion 46 of the fitting. The shoulder 29 of sleeve 28 is engaged with the lip 22 of nut 20 and this assembly inserted over the open end of tube 34. Obviously, if there is a flare on both ends of the tube 34, the sleeve and nut are positioned prior to flaring the end of the tube. The nut 20 is threaded on threads 13 of connector 12 and drawn tight. This forces the bevel 30 of sleeve 29 against the flared portion 36 of the tube which in turn clamps the flared portion 46 of the fitting between the connector and the tube. Thus, the strainer is clamped in position providing the correct installation of the strainer.

From the above description, it is believed apparent that the strainer is of a very simple design providing economy of structure with a minimum of weight. It is also apparent that the only space taken up by the strainer is that of the thickness of the flared portion of the strainer fitting. As is apparent in FIG. 1, this space is for all intents and purposes negligible as far as the overall design is concerned. The strainer is of sturdy construction and will withstand high pressures placed upon fluids within the passages and is therefore extremely reliable. Furthermore, the strainer does not interfere with the flow of fluids through the passages. The strainer can also be readily installed or removed as the situation demands and can be used with existing systems without modification of the system or the strainer. In addition, it is believed obvious that the particular design of the strainer does not affect the sealing capabilities of the connection.

Although the strainer is shown in combination with a particular connector and flared tube arrangement shown in FIG. 1, it is believed apparent that it can be readily used with most any type of flared tube connection which is available. Thus, the versatility of use of the particular type of strainer should be readily apparent.

While the preferred embodiment of this invention has been described, it will be understood that modifications and improvements can be made thereto. Such of these modifications and improvements as incorporate the principles of this invention are to be considered as included in the hereinafter appended claims unless these claims by their language expressly state otherwise.

What is claimed as new and desired to be secured by Letters Patent of the United States is:

1. A combination connector and strainer therefor comprising: a connector element having a passage formed therethrough; said connector element having a flared surface; a tube having a flared portion similar in shape to said connector element flared surface; strainer means; a fitting having an annular portion fixed to said strainer means and a flared portion turned back toward the strainer portion shaped similar to said connector element flared surface and tube flared portions and positioned therebetween; and means for joining said tube and connector elements so that said fitting flared portion is clamped therebetween and said strainer means positioned in said connector element passage.

References Cited

UNITED STATES PATENTS

| | | | |
|---|---|---|---|
| 2,658,625 | 11/1953 | Rafferty | 210—445 |
| 3,226,138 | 12/1965 | Ellis | 285—332.3 |
| 3,421,631 | 1/1969 | Hirsch | 210—445 |
| 3,474,911 | 10/1969 | Olsen | 210—318 |

OTHER REFERENCES

Catalog 4300, Parker-Hannifin, 17325 Euclid Ave., Cleveland, Ohio, rear cover relied on.

Catalog D–764, Commonwealth-Precision, 1964, 303 N. Jackson St., Andrews, Ind., p. 4; p. 20; p. 19.

REUBEN FRIEDMAN, Primary Examiner

T. A. GRANGER, Assistant Examiner